(12) United States Patent
Rehnberg

(10) Patent No.: US 8,522,464 B2
(45) Date of Patent: Sep. 3, 2013

(54) MAGNETIC BLOCKS WITH IMAGES THEREON, SYSTEMS AND METHODS OF MAKING THE SAME

(76) Inventor: Margaret L. Rehnberg, Algonquin, IL (US)

( * ) Notice: Subject to any disclaimer, the term of this patent is extended or adjusted under 35 U.S.C. 154(b) by 50 days.

(21) Appl. No.: 13/024,763

(22) Filed: Feb. 10, 2011

(65) Prior Publication Data
US 2012/0052267 A1  Mar. 1, 2012

Related U.S. Application Data

(60) Provisional application No. 61/378,449, filed on Aug. 31, 2010.

(51) Int. Cl.
*G09F 7/04* (2006.01)

(52) U.S. Cl.
USPC ............. 40/600; 40/621; 40/711; 40/735; 40/743

(58) Field of Classification Search
USPC ............. 40/124.04, 661.01, 600, 621, 711, 40/735, 743
See application file for complete search history.

(56) References Cited

U.S. PATENT DOCUMENTS

| | | | |
|---|---|---|---|
| 3,553,872 A * | 1/1971 | Ebner | ......................... 40/711 |
| 3,599,361 A | 8/1971 | Bowman et al. | |
| 3,786,584 A | 1/1974 | Holson | |
| 3,885,336 A | 5/1975 | Olsen | |
| 4,310,978 A | 1/1982 | Stern | |
| 4,642,257 A | 2/1987 | Chase | |
| 4,741,534 A * | 5/1988 | Rogahn | ..................... 273/151 R |
| 4,785,562 A | 11/1988 | Good | |
| 4,852,282 A | 8/1989 | Selman | |
| 4,912,864 A | 4/1990 | Price | |
| 5,077,921 A | 1/1992 | Mooney | |
| 5,172,503 A * | 12/1992 | Dane et al. | ..................... 40/600 |
| 5,195,263 A | 3/1993 | Huang | |
| 5,375,351 A | 12/1994 | King et al. | |

(Continued)

FOREIGN PATENT DOCUMENTS

| | | |
|---|---|---|
| JP | 06-064996 U | 9/1994 |
| JP | 2000-343898 A | 12/2000 |

(Continued)

OTHER PUBLICATIONS

International Search Report and Written Opinion of the Internation Searching Authority for copending Int'l App. No. PCT/US2011/049925.

*Primary Examiner* — Gary Hoge
(74) *Attorney, Agent, or Firm* — Scherrer Patent & Trademark Law, P.C.; Stephen T. Scherrer

(57) ABSTRACT

Magnetic blocks have images disposed thereon. Specifically, a block made from a rigid material includes an image over at least a portion of a first surface and a magnet on at least a portion of a second surface of the block. The block is disposed within a frame or board having a metallic and/or magnetic surface thereon and/or is provided on a metallic and/or magnetized surface. A plurality of blocks having images thereon are disposed together in a tiled arrangement, either in the frame, board or otherwise on the metallic and/or magnetic surface. Moreover, a system comprises the magnetic blocks having images thereon and a frame, board and/or metallic and/or magnetic surface. Methods of making and using the same are further provided.

18 Claims, 6 Drawing Sheets

(56) References Cited

U.S. PATENT DOCUMENTS

| | | |
|---|---|---|
| 5,609,788 A | 3/1997 | Deetz |
| 5,666,712 A | 9/1997 | Cvetkov |
| 5,699,956 A | 12/1997 | Brennan |
| 5,947,437 A | 9/1999 | Tate et al. |
| 6,010,338 A | 1/2000 | Watson |
| 6,052,933 A | 4/2000 | Lytle |
| 6,153,279 A | 11/2000 | Charley |
| 6,189,250 B1 | 2/2001 | Bell |
| 6,354,030 B1 | 3/2002 | Harris |
| 6,432,520 B2 | 8/2002 | Pynenburg et al. |
| 6,484,428 B1 * | 11/2002 | Greenwald et al. ............. 40/600 |
| 6,557,377 B1 | 5/2003 | Massari |
| 6,578,304 B1 * | 6/2003 | Lytle ............................... 40/711 |
| 6,665,972 B2 | 12/2003 | Hensel |
| 6,683,520 B1 * | 1/2004 | Sakai ........................... 335/285 |
| 6,688,029 B1 | 2/2004 | Dunn |
| 6,826,858 B1 | 12/2004 | Muller |
| 6,845,582 B1 | 1/2005 | Ho et al. |
| 7,114,278 B2 | 10/2006 | Marks et al. |
| 7,117,621 B2 | 10/2006 | Chang |
| 7,246,458 B2 * | 7/2007 | Ternovits et al. ............... 40/600 |
| 2001/0025443 A1 | 10/2001 | Martin |
| 2002/0078612 A1 | 6/2002 | Meacham et al. |
| 2003/0121194 A1 | 7/2003 | Rappaport et al. |
| 2004/0006903 A1 * | 1/2004 | Haytas ........................... 40/600 |
| 2004/0009370 A1 | 1/2004 | Abe |
| 2005/0005489 A1 | 1/2005 | Ridenour et al. |
| 2005/0076591 A1 | 4/2005 | Koeller |
| 2005/0166035 A1 | 7/2005 | Crum |
| 2005/0193613 A1 | 9/2005 | Faltesek |
| 2006/0143964 A1 | 7/2006 | Chatellier et al. |
| 2006/0191181 A1 | 8/2006 | Marshall |
| 2007/0062086 A1 * | 3/2007 | Hamel et al. .................... 40/605 |
| 2007/0113454 A1 | 5/2007 | Kerns |
| 2008/0022571 A1 | 1/2008 | Ogikubo |
| 2008/0229639 A1 | 9/2008 | Barkley |
| 2008/0229640 A1 | 9/2008 | Saunders-Singer |
| 2009/0249671 A1 | 10/2009 | Lapesky |
| 2009/0282715 A1 | 11/2009 | Pemberton |
| 2010/0154266 A1 | 6/2010 | Vincent |

FOREIGN PATENT DOCUMENTS

| | | |
|---|---|---|
| JP | 2004-330766 A | 11/2004 |
| KR | 10-1993-0007218 B1 | 9/1996 |
| KR | 10-1996-0011835 B1 | 9/1996 |

\* cited by examiner

MAGNETIC BLOCKS WITH IMAGES THEREON, SYSTEMS AND METHODS OF MAKING THE SAME

The present invention claims priority under 35 U.S.C. 119 to U.S. Provisional Patent Application No. 61/378,449 entitled "Magnetic Blocks with Images Thereon, Systems and Methods of Making the Same", filed Aug. 31, 2010.

TECHNICAL FIELD

The present invention relates to magnetic blocks having images thereon. Specifically, a block made from a rigid material may have an image over at least a portion of a first surface and a magnet on at least a portion of a second surface of the block. The block may then be disposed within a frame having a metallic and/or magnetic surface thereon or may be provided on a metallic and/or magnetized surface. A plurality of blocks having images thereon may be disposed together in a tiled arrangement, either in the frame or otherwise on the metallic and/or magnetic surface. Moreover, a system comprising the magnetic blocks having images thereon and a frame and/or metallic and/or magnetic surface is provided. Methods of making and using the same are further provided.

BACKGROUND

It is, of course, generally known to dispose images on a surface for artistic purposes, educational purposes, communication purposes or other like purposes. Typically, images are disposed on a medium, such as any surface that may take the image, whether an element of artistic expression in the form of an image, a word or the like. In many cases, the images, disposed on a medium, such as a canvas for example, and are displayed on a surface, such as a wall, in a frame, or in other ways apparent to one of ordinary skill in the art.

For the most part, once an image is fixed on a medium, the image is unchanging. To provide for more dynamic expression, a plurality of images may be tiled together. For example, photographs and/or drawings may be disposed within frames, wherein the frames are attached to a surface adjacently, so that the full expression is comprised of the individual images. Therefore, the images may be changed around when desired, and the overall image may be changed.

Typically, to hang an image that is disposed on a medium requires a fixture to be embedded or otherwise affixed to a wall. For example, many times when a picture, photograph, or other image is displayed on a wall, the fixture permanently damages the wall. A nail, screw, hook or other hanging means is typically embedded into the wall or other surface and the image is typically hung on the nail, screw, hook or other hanging means. Not only is the surface damaged by permanently embedding a fixture therein, but the image and/or images must then be disposed in that exact location, unless many fixtures are permanently added to the surface. However, this mars the surface of the wall, decreases the structural integrity of the surface, and is unsightly.

In addition, it is oftentimes difficult to hang an image perfectly on a wall with a permanent fixture embedded therein. In many cases, the image, whether disposed in a frame or not, may have to hang from a wire, or be disposed on a hook or other means that may be difficult to line up correctly. In addition, many times, images hung from a permanent fixture may move, wobble, swing or otherwise change position over time.

Moreover, while it is known to tile images together to form a larger image, many times it is difficult to add dimensionality to the tiled images. Specifically, images that are tiled together typically are disposed on a same or similar plane, creating a tiled image that lacks dimensionality.

A need, therefore, exists for images to be disposed on a medium that may be disposed directly to a surface without requiring unsightly permanent fixtures disposed through or on a surface, such as a wall or the like. Moreover, a need exists for images to be disposed on a medium that may be easily removably attached to a display surface, such as in a frame or on a surface.

A need further exists for magnetic blocks having images provided thereon, wherein a user or owner of the blocks may have his or her own images may be disposed thereon, including the user's own photography or art.

Moreover, a need exists for one or more images to be disposed on a plurality of media, wherein the media may be easily tiled together to form a larger image and/or expression utilizing the plurality of media. In addition, a need exists for images to be disposed on a medium, wherein the disposition of the images includes painting, printing, drawing or any other disposition means to the medium. Moreover, a need exists for disposing images on a medium, wherein the medium is a rigid block of material, such as wood, for example, wherein the medium has strength and durability.

Further, a need exists for disposing images on a medium wherein the medium is a block of rigid material, and at least a portion of a first surface of the medium has the image disposed thereon and at least a portion of a second surface of the medium has a magnetic material disposed thereon. Still further, a need exists for disposing images on a medium, wherein the medium is magnetized and able to be displayed on a metallic and/or magnetized surface.

And, a need exists for disposing a first image on a first medium and a second image on a second medium, wherein the first and second media include at least a portion that is magnetic such that the first and second media may be attached to a metallic and/or magnetized surface in a tiled arrangement. Moreover, a need exists for disposing the first and second media in a tiled arrangement such that the first medium has a height from the surface that is different from the height of the second medium from the surface to add a layer of depth to the image created by the first and second media.

In addition, a need exists for providing one or more magnetic blocks having images thereon, wherein the one or more magnetic blocks provide audible sounds, smells, lights or other sensory stimuli. Further, a need exists for providing a plurality of magnetic blocks having sensory stimuli that may change based on the interaction of the magnetic blocks together.

Still further, a need exists for providing one or more magnetic blocks having images thereon, wherein the magnetic blocks include images on more than one surface, such as on opposite surfaces of the blocks and further include magnetic material on more than one surface, such as on opposite surfaces of the blocks so that the blocks may be reversible or otherwise have additional ways of being arranged.

SUMMARY OF THE INVENTION

The present invention relates to magnetic blocks having images thereon. Specifically, a block made from a rigid material may have an image over at least a portion of a first surface and a magnet on at least a portion of a second surface of the block. The block may then be disposed within a frame having a metallic and/or magnetic surface thereon or may be provided on a metallic and/or magnetized surface. A plurality of blocks having images thereon may be disposed together in a tiled arrangement, either in the frame or otherwise on the metallic and/or magnetic surface. Moreover, a system comprising the magnetic blocks having images thereon and a frame and/or metallic and/or magnetic surface is provided. Methods of making and using the same are further provided.

To this end, in an embodiment of the present invention, a magnetic image block system is provided. The magnetic image block system comprises a block having a first flat surface and a second flat surface, wherein an image is displayable on the first flat surface; a magnet rigidly disposed on the second surface.

In an embodiment, the magnet is disposed on the second surface of the block with an adhesive.

In an embodiment, the block includes a surface made of a material selected from the group consisting of a metal, a magnet, and combinations thereof, wherein the magnet is disposed on the second surface via magnetic attraction between the magnet and the block.

In an embodiment, the magnetic image block system further comprises an extender disposed between the magnet and the second surface.

In an embodiment, the extender is adhered to the second surface of block and the magnet is adhered to the extender.

In an embodiment, the extender is magnetically held to the block and the magnet is magnetically held to the extender.

In an embodiment, the extender is the same shape as the block.

In an embodiment, the magnetic image block system further comprises: an image disposed on the first surface of the block.

In an embodiment, the magnetic image block system further comprises a surface, wherein the block is magnetically held to the surface.

In an embodiment, the surface is selected from the group consisting of magnetic paint, a metal sheet, a sheet comprising at least one magnet, and combinations thereof.

In an embodiment, the magnetic image block system further comprises: a frame, wherein the block is disposed within the frame, and further wherein the block is magnetically held within the frame.

In an embodiment, the magnetic image block system further comprises: a second block, the second block having a first flat surface and a second flat surface, wherein an image is displayable on the first flat surface, and a magnet rigidly disposed on the second surface, wherein the first block and the second block are disposed in proximity to each other.

In an embodiment, the first block has a first depth, and the second block has a second depth, wherein the first depth is larger than the second depth.

In an alternate embodiment of the present invention, a method of making a magnetic image block system is provided. The method comprises the steps of: selecting an image; providing a first block having a first flat surface and a second flat surface, wherein an image is displayable on the first flat surface, and a magnet is rigidly disposed on the second flat surface; and printing at least a portion of the image onto the block on the first flat surface.

In an embodiment, the method further comprises the step of disposing the first block onto a surface, wherein the first block is magnetically held to the surface.

In an embodiment, the method further comprises the steps of: providing a second block having a first flat surface and a second flat surface, wherein an image is displayable on the second flat surface, and a second magnet is rigidly disposed on the second flat surface of the second block; and printing at least a portion of the image onto the first flat surface of the second block.

In an embodiment, the method further comprises the step of: disposing the first block in close proximity to the second block on a surface, wherein the first and second blocks are magnetically held to the surface.

In an embodiment, wherein disposing the first block in proximity to the second block displays the entirety of the first image.

In an embodiment, the method further comprises the steps of: providing a second block having a first flat surface and a second flat surface, wherein an image is displayable on the second flat surface, and a second magnet is rigidly disposed on the second flat surface of the second block; and printing at least a portion of a second image onto the first flat surface of the second block.

In an embodiment, the method further comprises: uploading the image into a computer system, wherein the computer system controls a printer for printing the first image onto the first block.

It is, therefore, an advantage of the present invention to dispose images on a medium that may be disposed directly to a surface without requiring unsightly permanent fixtures disposed through or on a surface, such as a wall or the like.

Moreover, it is an advantage of the present invention to dispose images on a medium that may be easily removably attached to a display surface, such as in a frame or on a surface.

It is a further advantage of the present invention to provide magnetic blocks having images provided thereon, wherein a user or owner of the blocks may have his or her own images may be disposed thereon, including the user's own photography or art.

Further, it is an advantage of the present invention to dispose one or more images on a plurality of media, wherein the media may be easily tiled together to form a larger image and/or expression utilizing the plurality of media.

In addition, it is an advantage of the present invention to dispose one or more images on a medium, wherein the disposition of the images includes painting, printing, drawing or any other disposition means to the medium.

Moreover, it is an advantage of the present invention to dispose one or more images on a medium, wherein the medium is a rigid block of material, such as wood, for example, wherein the medium has strength and durability.

Further, it is an advantage of the present invention to dispose one or more images on a medium wherein the medium is a block of rigid material, and at least a portion of a first surface of the medium has the image disposed thereon and at least a portion of a second surface of the medium has a magnetic material disposed thereon.

Still further, it is an advantage of the present invention to dispose one or more images on a medium, wherein the medium is magnetized and able to be displayed on a metallic and/or magnetized surface.

And, it is an advantage of the present invention to dispose a first image on a first medium and a second image on a second medium, wherein the first and second media include at least a portion that is magnetic such that the first and second media may be attached to a metallic and/or magnetized surface in a tiled arrangement.

Moreover, it is an advantage of the present invention to dispose the first and second media in a tiled arrangement such that the first medium has a height from the surface that is different from the height of the second medium from the surface to add a layer of depth to the image created by the first and second media.

In addition, it is an advantage to provide one or more magnetic blocks having images thereon, wherein the one or more magnetic blocks provide audible sounds, smells, lights or other sensory stimuli. Further, it is an advantage to provide a plurality of magnetic blocks having sensory stimuli that may change based on the interaction of the magnetic blocks together.

Still further, it is an advantage of the present invention to provide one or more magnetic blocks having images thereon, wherein the magnetic blocks include images on more than one surface, such as on opposite surfaces of the blocks and further include magnetic material on more than one surface, such as on opposite surfaces of the blocks so that the blocks may be reversible or otherwise have additional ways of being arranged.

Additional features and advantages of the present invention are described in, and will be apparent from, the detailed description of the presently preferred embodiments and from the drawings.

BRIEF DESCRIPTION OF THE DRAWINGS

The drawing figures depict one or more implementations in accord with the present concepts, by way of example only, not by way of limitations. In the figures, like reference numerals refer to the same or similar elements.

DETAILED DESCRIPTION OF THE PRESENTLY PREFERRED EMBODIMENTS

Magnetic blocks having images thereon are described herein. Specifically, a block made from a rigid material may have an image over at least a portion of a first surface and a magnet on at least a portion of a second surface of the block. The block may then be disposed within a frame having a metallic and/or magnetic surface thereon or may be provided on a metallic and/or magnetized surface. A plurality of blocks having images thereon may be disposed together in a tiled arrangement, either in the frame or otherwise on the metallic and/or magnetic surface. Moreover, a system comprising the magnetic blocks having images thereon and a frame and/or metallic and/or magnetized surface is provided. Methods of making and using the same are further provided.

Figure 1:
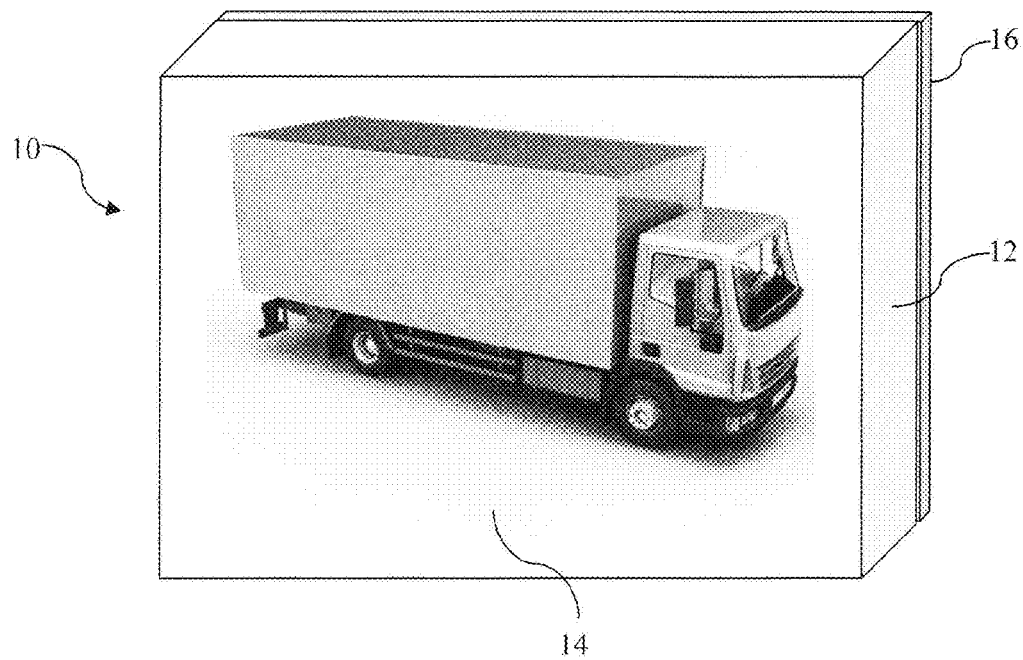
FIG. 1 illustrates a perspective view of a magnetic block in an embodiment of the present invention.

Now referring to the figures, wherein like numerals refer to like parts, a magnetic block 10 is provided. The magnetic block 10 is illustrated as a three-dimensional rectangle, although the magnetic block 10 may be any shape, such as three-dimensional square, circle, oval, puzzle piece, or any other shape apparent to one having ordinary skill in the art. The magnetic block 10 comprises a block portion 12 that is made from any durable, resilient material apparent to one having ordinary skill in the art, such as wood, plastic, metal, or any other material. On the block portion 12 may be an image 14. FIG. 1 illustrates a truck as the image 14 disposed thereon. However, it should be noted that the image may be any image, color, word, sentence, text, graphic, photograph, or any other image that may be disposed on the block portion 12. Moreover, in an alternate embodiment, the bock portion 12 may be blank, so that a user may disposed his or her own image thereon, such as by painting, drawing, printing or the like. The image 14 may be painted, printed, drawn, burned, or laid upon the block portion 12 in any way apparent to one having ordinary skill in the art. Preferably, the image 14 is printed thereon using conventional printing methods.

In an alternate embodiment of the present invention, the images may be printed or otherwise disposed on a material that may be adhered to a surface of the magnetic blocks. In a preferred alternate embodiment, an image may be printed or otherwise disposed on a metallic and/or magnetic material and magnetically adhered to a surface of the magnetic block. Therefore, images may be removably attached to the magnetic blocks making it easy to change images on the blocks allowing for alternate arrangements of the blocks pursuant to the user's wishes.

The magnetic block 10 may be any size, including any length, any width and any depth. For example, the magnetic block 10 may be relatively small, such as about 1 inch by 1 inch by 1 inch, or may be relatively large, such as many inches or even feet in dimension. Moreover, the magnetic block 10 may have any depth, such as a shallow depth or a very deep depth.

Figure 2:
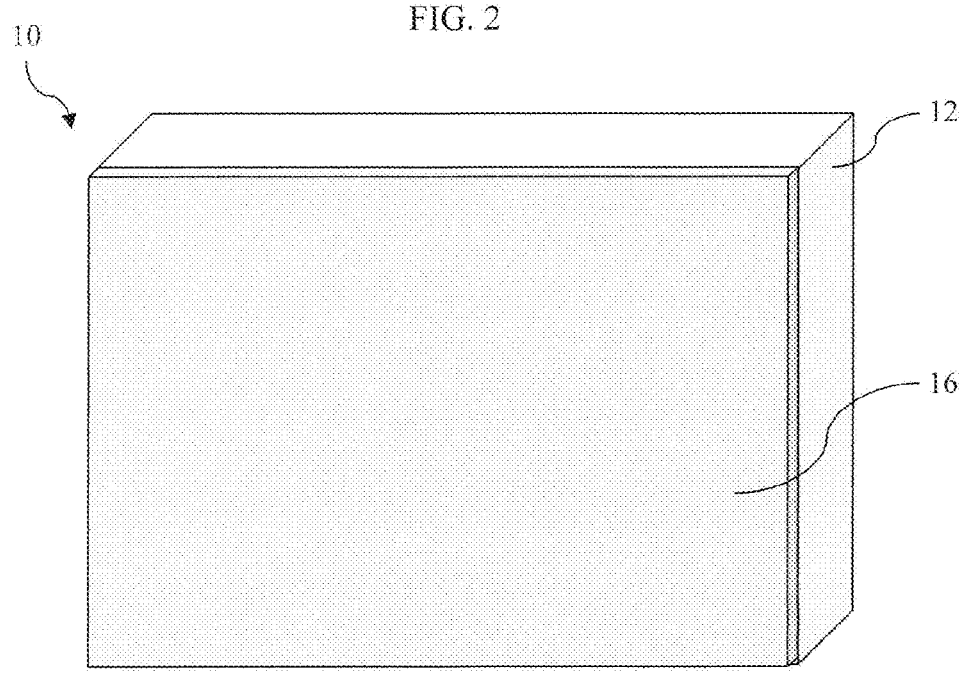
FIG. 2 illustrates a back-side perspective view of a magnetic block in an embodiment of the present invention.

Adhered to a back side of the block portion 12 may be a magnetic material 16. The magnetic material, as shown in further detail in FIG. 2, may be a strip of magnetized material, such as a flexible magnetic material, a rigid magnetic material or the like, that may be adhered or otherwise affixed to the block portion 12. Preferably, the magnetic material 16 may be adhered to the block portion 112 using a strong adhesive so that the magnetic material 16 may not be removed from the block portion 12. Alternatively, the block portion 12 may be made from metal, or at least a portion may be made from metal, such that the magnetic material 16 may be affixed to the block portion 16 using magnetism.

Preferably, the magnetic material 16 is affixed over the entire back surface of the block portion 12 to provide the strongest magnetic adherence to a metallic or magnetized surface (as disclosed in more detail below). However, the magnetic material 16 may be disposed on only a portion of the back surface of the block portion 12, or in two or more discrete locations on the back surface of the block portion 12.

In an alternate embodiment of the present invention, the magnetic blocks of the present invention may include images on more than one surface of the magnetic blocks, such as on opposite surfaces of the magnetic blocks. Moreover, magnetic material may be provided on more than one surface of the magnetic blocks, such as on the opposite surfaces of the magnetic blocks, thereby making the magnetic blocks reversible, or able to be arranged in many alternate ways.

Figure 3:
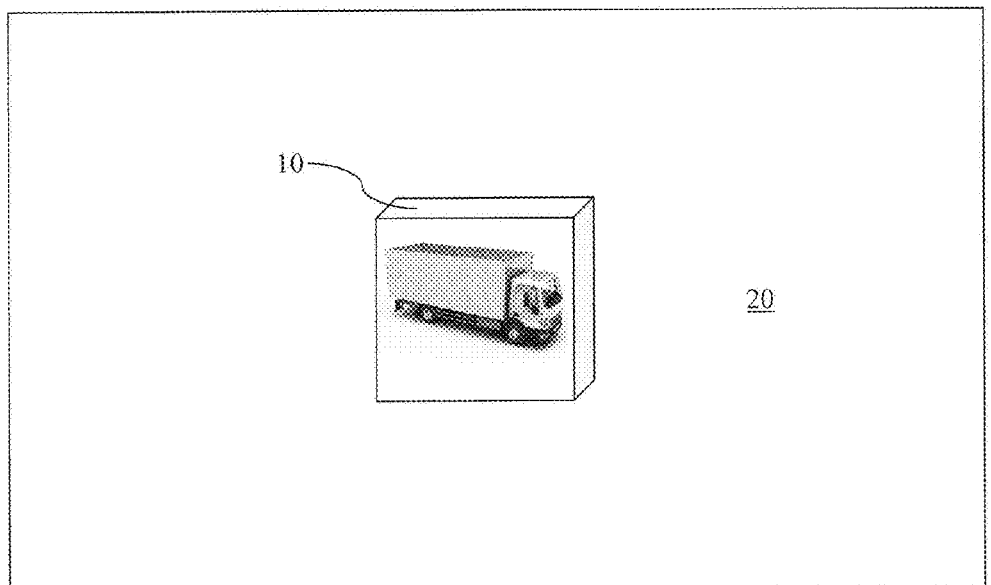
FIG. 3 illustrates a perspective view of a magnetic block magnetically adhered to a surface in an embodiment of the present invention.

FIG. 3 illustrates the magnetic block 10 disposed on a surface 20. The surface 20 may be made from a metallic and/or magnetized material so that the magnetic block 10 may be disposed thereon, and may be affixed thereto via the magnetism of the magnetic block 10 and its interaction with the metallic and/or magnetized surface 20.

For example, the surface 20 may be a metallic plate affixed to a wall or other surface, or otherwise free standing, whereby the magnetic block 10 may be affixed thereto. Moreover, the surface 20 may be made from a magnetized material such that the magnetic material 16 disposed on the magnetic block 10 may be affixed to the magnetized material of the surface 20. For example, the surface 20 may be a refrigerator door, commonly known to provide a metallic and/or magnetized surface on which to affix magnetic material. In addition, the surface 20 may be a standard wall that is coated with a metallic and/or magnetized material. For example, metallic and/or magnetic paint is commonly used to paint on wall surfaces to provide a surface on which to disposed magnetic material. The metallic and/or magnetic paint may be painted onto a surface, and a second paint may be painted thereover. Alternatively, the metallic and/or magnetic paint may be mixed with a pigment or paint and painted directly onto a wall surface.

Figure 4:
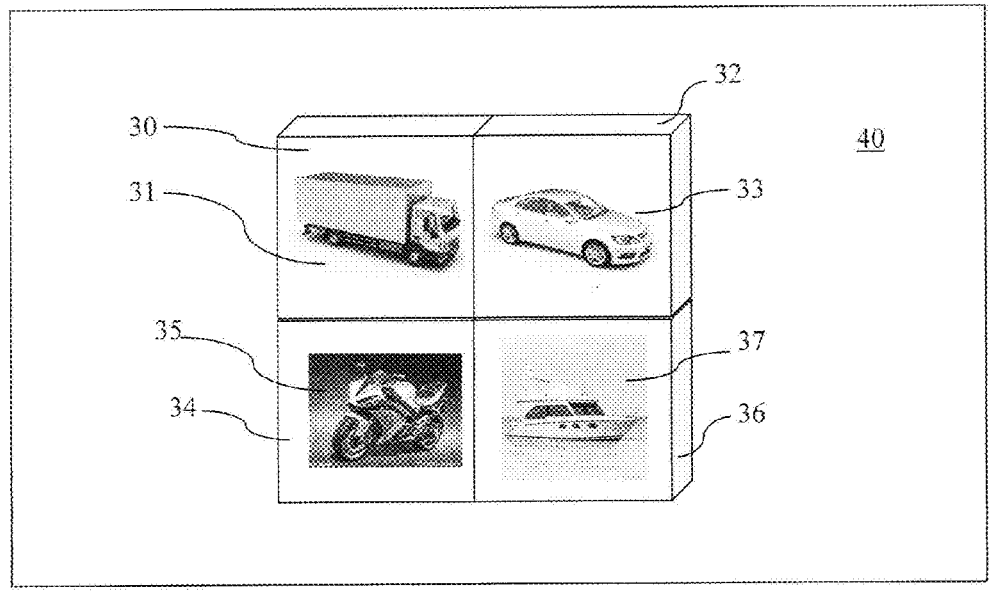
FIG. 4 illustrates a perspective view of a plurality of magnetic blocks tiled together and magnetically adhered to a surface to form an image in an embodiment of the present invention.

Referring to FIG. 4, a plurality of magnetic blocks 30, 32, 34 and 36 are illustrated affixed to a surface 40. The magnetic blocks 30, 32, 34 and 36 may be affixed together to form a single image, or a single artistic expression. As illustrated, images 31, 33, 35 and 37 may be disposed thereon, all relating to the common theme of vehicles, for example, as a single artistic expression.

The magnetic blocks 30, 32, 34 and 36 may be affixed together on the metallic and/or magnetic surface 40 in any pattern. In FIG. 4 the magnetic blocks 30, 32, 34 and 36 are disposed adjacent one another. Because each of the magnetic blocks 30, 32, 34 and 36 has a magnetic material disposed thereon, they may be moved and arranged in any configuration desired, and placed in any location on the surface 40. Therefore, the arrangement has infinite possibilities of arrangement, without damaging the surface 40 or requiring a permanent fixture to be disposed on or in the surface 40. In an alternate embodiment, the magnetic blocks 30, 32, 34 and 36 may include magnetic material on the side surfaces of the magnetic blocks 30, 32, 34 and 36 allowing the magnetic blocks to be magnetically adhered together when adjacently configured.

Figure 5:
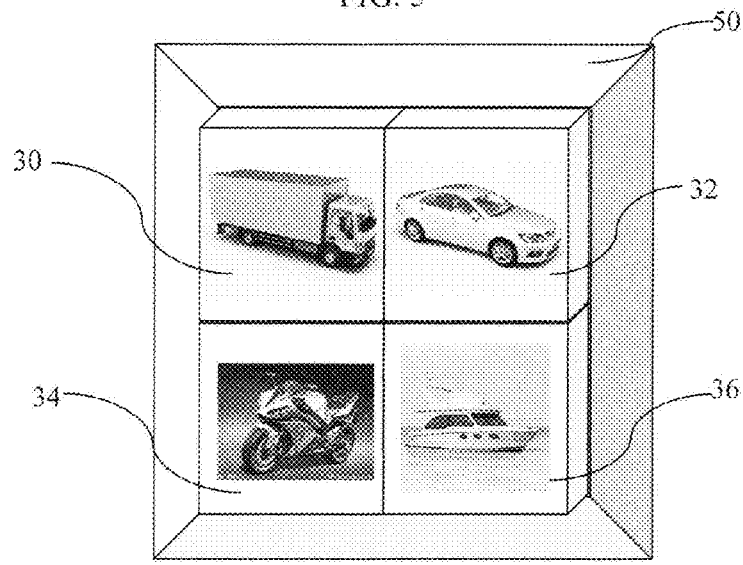
FIG. 5 illustrates a perspective view of plurality of magnetic blocks magnetically adhered within a frame in an embodiment of the present invention.

Alternatively, as disclosed in FIG. 5, the magnetic blocks 30, 32, 34 and 36 may be disposed within a frame 50 that may have a metallic and/or magnetic material disposed therein. Therefore, the magnetic blocks 30, 32, 34 and 36 may be arranged in any way within the frame 50. The frame 50 may be displayed in any manner apparent to one having ordinary skill in the art, such as via a prop or stand, or affixed to a wall using a fixture. Of course, any size frame may be utilized, and any number of magnetic blocks may be disposed thereon, depending on size of the blocks.

Figure 6:
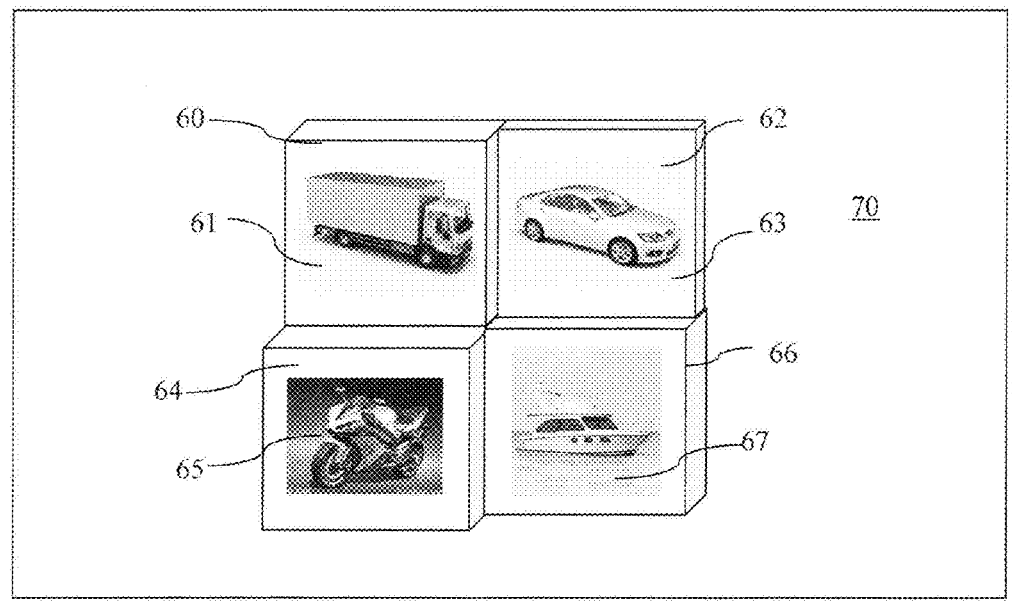
FIG. 6 illustrates a perspective view of a plurality of magnetic blocks creating dimensionality in the image formed by the plurality of magnetic blocks magnetically adhered to a surface in an embodiment of the present invention.

FIG. 6 illustrates an alternative embodiment of the present invention of a plurality of magnetic blocks 60, 62, 64 and 66 disposed adjacent each other on a surface 70. The magnetic blocks 60, 62, 64 and 66 may have images 61, 63, 65 and 67 disposed thereon, as described herein. Each of the blocks 60, 62, 64 and 66 may have the same or different dimensions. For example, the magnetic block 62 may have a shallower depth than the other magnetic blocks 60, 64 and 66. Moreover, the magnetic block 64 may have a deeper depth than the other magnetic blocks 60, 62 and 66. Therefore, the magnetic block 62 may stand out less from the surface 70 than the other blocks 60, 64 and 66, while the magnetic block 64 may stand out more from the surface 70 than the other blocks 60, 62 and 66. This may add dimension to the magnetic blocks that may be utilized to form a tiled image or expression.

Figure 7:
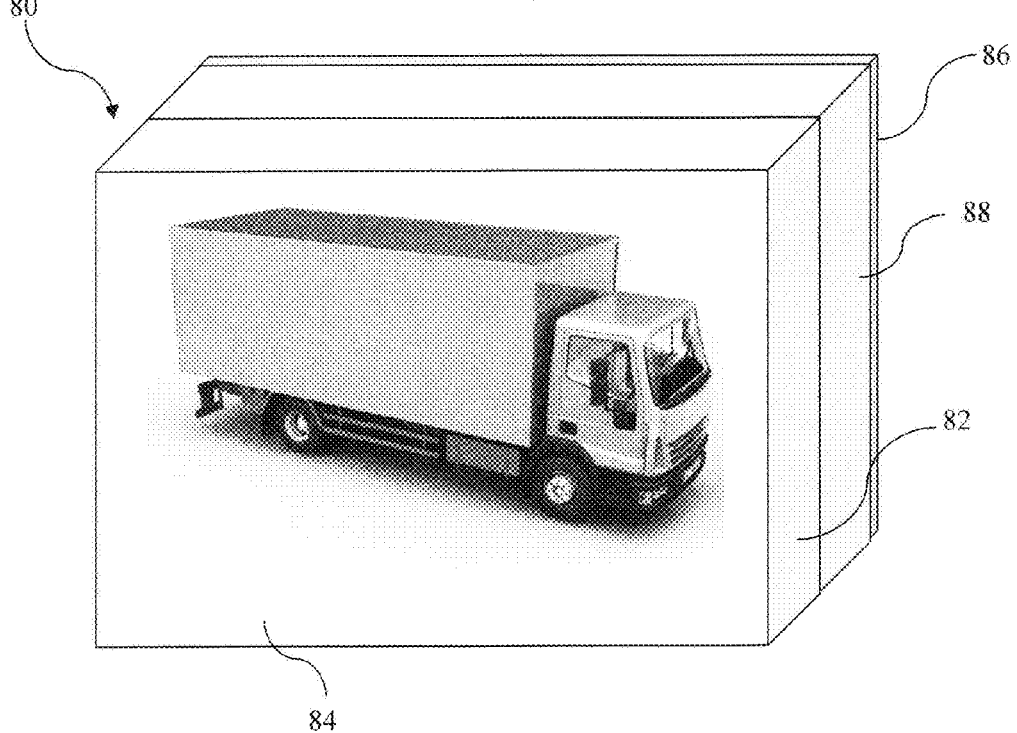
FIG. 7 illustrates a perspective view of a magnetic block with an extender in an embodiment of the present invention.

To accomplish the difference in depth, as illustrated above, the magnetic blocks each may each have a block portion 12 that has a different depth dimension, as illustrated in FIG. 6. Alternatively, as illustrated in FIG. 7, the magnetic block 80 may include a block portion 82, an image 84 and a magnetic material 86, but may also include an extender 88 that may be affixed between the magnetic material 86 and the block portion 82 to provide a deeper depth of the magnetic block 80. Different sizes of extenders may be utilized to provide magnetic blocks with varying depths, such that when disposed together as a single expression, the overall tiled image may have different dimensional properties. The extender 88 may be affixed to the magnetic block 80 in any way, such as using adhesive or magnetically. For example, an extender that may be metallic and/or magnetic, or at least have a portion that is metallic and/or magnetic, may be disposed on the magnetic material on the block portion of the magnetic block (not shown). The extender may further have a magnetic material disposed thereon for affixing the magnetic block with the extender to a metallic and/or magnetic surface or frame, as disclosed herein.

In an alternative embodiment, magnetic blocks of the present invention may be different shapes, than square or rectangular as described herein. For example, blocks may be round, oval, triangular, or may have other shapes, such as shapes of objects. In an alternative embodiment, the magnetic blocks of the present invention may be shaped like puzzle pieces, whereby the blocks fit together to form a puzzle. A full singular image may be disposed over a plurality of blocks, whether square, rectangular, puzzle piece-shaped or in any other shape, wherein placing the blocks together completes the singular image. Thus, a large wall image may be created by the magnetic blocks of the present invention.

In an alternate embodiment of the present invention, the magnetic blocks disclosed herein may include other sensory stimuli, such as an audible component, a smell component, or visible lighting. Specifically, in an embodiment of the present invention, a speaker may be contained in one or more magnetic blocks to recreate sound from the one or more magnetic blocks. The sounds may play at all times, or at discrete times. In addition, the sounds may be triggered by a switch, such as a manual switch, a light-activated switch, an IR-switch, or some other switch that may play the sound when a person moves near the magnetic blocks or otherwise comes close to the magnetic blocks. In addition, the magnetic blocks may contain a microchip containing the audible sound that may be played through the speaker contained in the magnetic block. Preferably, the microchip and speaker are hidden from view. Alternatively, the microchip contained within one magnetic block may be programmed to detect the presence of other individual magnetic blocks disposed close by, and may play a preprogrammed sound because of the detection of the other individual magnetic block or blocks.

For example, a first magnetic block may have a plurality of preprogrammed sounds disposed therein. A second magnetic block may be disposed adjacent to the first magnetic block. The first magnetic block may detect the presence of the second magnetic block, via direct connection between the first and second magnetic blocks (such as via probes on the sides of the first and second magnetic blocks that may physically interact) or via wireless detection. Once the second magnetic block is detected by the first magnetic block, an audible sound may be emitted from the first magnetic block because of the detection of the second magnetic block. For example, the audible sound emitted by the first magnetic block may relate in some way to the image on the second magnetic block. In a non-limiting example, it may appear that the magnetic blocks are "conversing" with each other, either via detectable human speech, animal noises, or some other audible sounds when disposed adjacent each other.

Alternatively, magnetic blocks of the present invention may each have a portion of a musical score, such that when disposed together, each of the blocks fills in the portion of the score to create a full musical expression. By way of example, the magnetic blocks of the present invention may each audibly express a single instrument that may be play a portion of a piece of music, such as only the notes typically played by that instrument when performing that music. Thus, when a plurality of magnetic blocks are arranged together or otherwise in close proximity, the playing of the magnetic blocks, each playing a separate instrument, may come together to play the entirety of the music. As noted above, the blocks may detect when in close proximity, either through probes or via wireless detection and may synchronize themselves to play together at the same time. Alternatively, the blocks may be programmed to detect a signal, or may be set manually, to play in synchronicity with each other.

Moreover, in alternate embodiments of the present invention, the magnetic blocks may contain other sensory stimuli, such as smells and flashing lights that may be emitted by one or more magnetic blocks. As disclosed above with reference to the audible component that may be emitted, certain smells may be emitted when a plurality of magnetic blocks are disposed adjacently to each other or otherwise in close proximity. In addition, certain lights, such as certain colors of lights, provided for example by LEDs disposed within the blocks, may flash and/or glow by the magnetic blocks. These may also be interactive, such that the lights may flash and/or glow when magnetic blocks are disposed adjacently or in close proximity to each other.

As noted above, the blocks of the present invention may be placed on a magnetic wall, whether painted with magnetic paint or otherwise having magnetic properties, and the magnetic blocks may be added to the wall to form an image or a plurality of images. The wall may be covered by the blocks of the present invention completely, or may only be partially covered by the blocks, such that the area of the wall with blocks disposed thereon may be expanded in the future with further blocks of the present invention, allowing the images or images to grow over time.

Figure 8A:
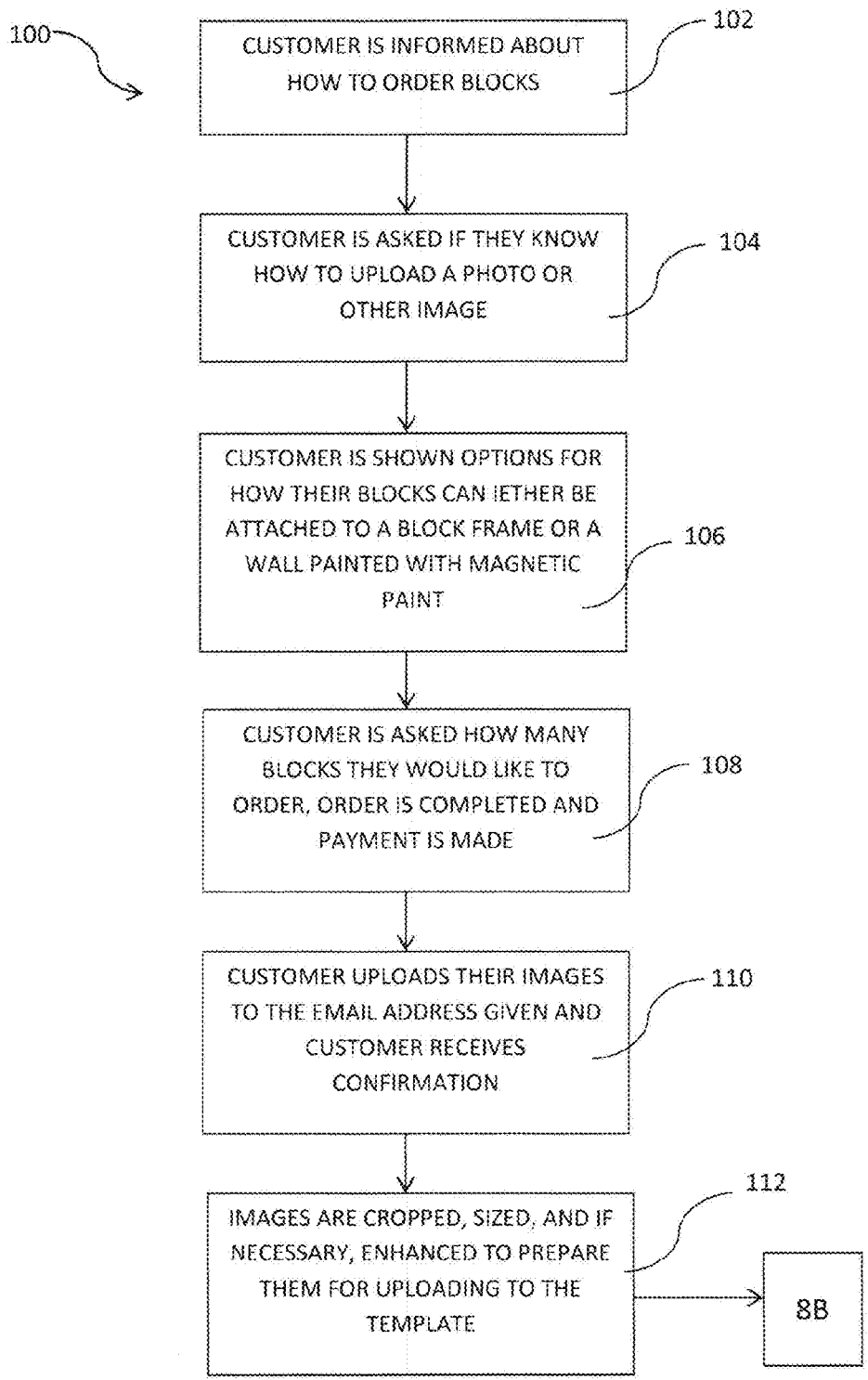
FIGS. 8A-8B illustrate a flow chart showing the steps for disposing images on magnetic blocks and displaying the same in an embodiment of the present invention.
Figure 8B:
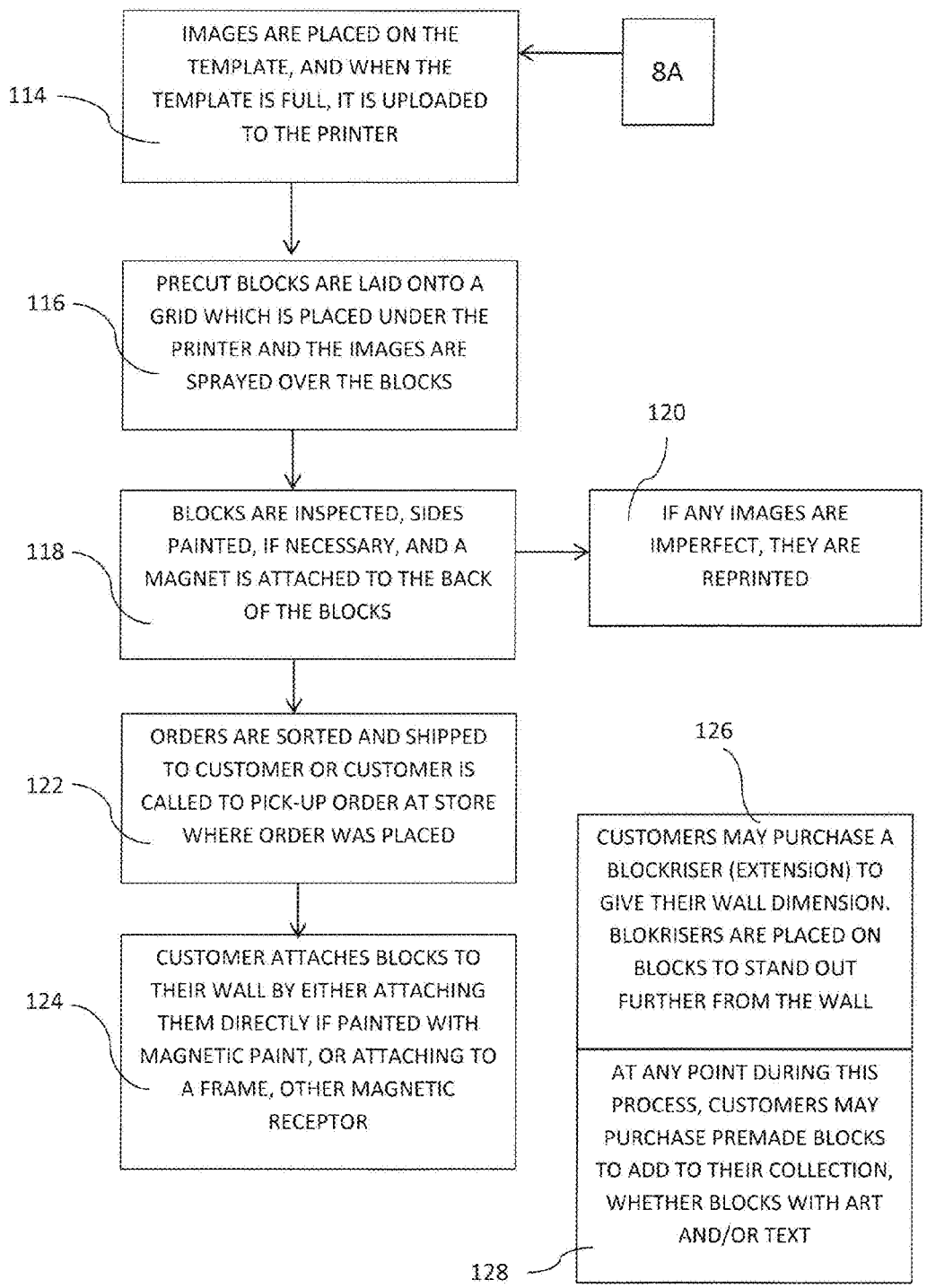

In an embodiment of the present invention, the magnetic blocks disclosed herein may be blank so that a user may paint, draw, print or otherwise dispose an image thereon. FIGS. 8A, 8B illustrates a preferred method 100 of making the magnetic blocks of the present invention. Specifically, FIGS. 8A, 8B includes step 102, "Customer is informed how to order blocks." Specifically, a customer who may want blocks printed may learn about the magnetic blocks, and may choose to order one or more of the magnetic blocks. This may be performed at a retail store, on a website, or directly person to person. In step 104, the "Customer is asked if they know how to upload a photo." Specifically, the customer is given a sheet explaining how to upload a photograph. If online, they may view and/or print out these instructions.

In step 106, "Customer is shown the options for how their blocks can either be attached to a block frame or a wall painted with magnetic paint." If they are going to paint a wall with magnetic paint, they may be given (or may view and/or print if online), written instructions about how to do so. In step 108, "Customer is asked how many blocks they would like to order, order is completed & payment is made." In this step, information from the customer is conveyed orally or submitted electronically if they are ordering online.

In step 110, "Customer uploads their images to the email address given and customer receives confirmation." If questions arise, the customer may call or email their questions to the location they placed the order, or may discuss with a helper or retail salesperson. In this step, the customer may dictate how they want their magnetic blocks to look, and the particular images may be uploaded. The customer may upload their own images, such as photographs and/or other artwork, or the customer may select stock images already stored on the system. The images may be digital photographs or images, or may be images that are scanned into computer readable files by means of a scanner or via other means. The images may be separate images for each magnetic block, or may be a single image that is divided among the number of blocks that are ordered, such that the blocks may be utilized to be put together to form the entirety of the single image.

In step 112, "Images are cropped, sized, and if necessary, enhanced to prepare them for uploading to the template." If questions arise, the customer may be called or emailed for clarification regarding their order or photographs. Alternatively, a helper or salesperson may directly communicate with the customer to answer these questions. The images may also be edited or manipulated. For example, the background of the photograph or image that is to be disposed on the block may be replaced with an artistic background creating a layer of art behind or merged with the photograph.

Referring now to FIG. 8B, in step 114, "Images are placed on the template, and when the template is full, the images are uploaded to the printed." In step 116, "Precut blocks are laid onto a grid which is placed under the printer and the images are sprayed over the blocks." Any printing method apparent to one having ordinary skill in the art may be utilized to provide the images to the blocks, as described herein. In a preferred embodiment, the images are printed using screen printing, ink jet printing, or any other method apparent to one of ordinary skill in the art. Protective coatings may be provided on the blocks so that the image may be protected, such as on blocks that are used in outdoor environments, or for any other reason to protect the image displayed on the blocks.

In step 118, "Blocks are inspected, sides are painted if necessary and a magnet is attached to the back of the block." In step 120, "If any images are imperfect, they are reprinted." In step 122, "Orders are sorted and shipped to customer or customer is called to pick up order at store where order was placed." Finally, in step 124, "Customer attach their blocks to their wall by either attaching them directly to a wall if it has been painted with magnetic paint, attach them to a block frame, other magnetic receptor." The "other magnetic receptor," as used herein, may be any surface having metallic and/or magnetic properties, such as, for example, a refrigerator, filing cabinet, locker or the like.

In alternative step 126, "Customers may purchase a blokriser™ (extender) in order to give their blokwall™ dimension. Blokrisers are placed on whichever blocks they wish to stand out further from their wall." Finally, in alternative step 128, "At any point during this process, customers may purchase pre-made blocks to add to their collection, whether blocks are with or without text." In a preferred embodiment, a plurality of blocks may be purchased or created that tell a singular and/or a unique story, such that when disposed on the wall, the singular and/or unique story may be expressed.

The magnetic blocks of the present invention may be utilized by individuals in their homes, businesses and organizations. For example, businesses and organizations may use the blocks described herein to show images of staff, customers, logos, slogans, inspirational quotes and other like imagery.

The blocks may be utilized to tell a story, and/or may be used for fundraising. In addition, the blocks may be used to thank donors, recognize benefactors, employees, musicians, celebrities, families or family members, and/or team members, for example.

In an alternate embodiment, a wall of the blocks having images thereon may be covered, and the blocks with the images thereon revealed over time. For example, donors may make a donation or purchases may otherwise purchase blocks of the present invention. Specifically, the blocks may be purchased by individuals or donors may donate money for block as part of a fundraising effort. When a donor donates money for a block or otherwise purchases a block, the block, having the image maybe added to the wall, thereby helping to complete the full reveal of all of the images of the wall. Alternatively, a block of the present invention may be disposed over the image on another block or over an image disposed on a wall or other surface, and may be easily removable. For example, blocks of the present invention may be disposed over an existing image disposed on a magnetic wall, such that donors may donate money or otherwise purchase a block. The block may then be removed showing the image disposed beneath. The blocks may also have images and/or text disposed thereon, and the donor or purchaser may keep the block that is removed as a keepsake.

Businesses such as dentist offices may utilize the blocks of the present invention to display images of the smiles of their patients. Daycare facilities may display images of children and/or the art of children and/or staff. Schools may utilize the blocks of the present invention to display images of students and/or artwork thereof. Games may be created, and words may be disposed on the blocks for aiding students in learning.

Artists may utilize the blocks of the present invention to display their artwork. Specifically, an image of an artist's work may be displayed on a plurality of blocks of the present invention, such that when tiled together they form a full image of the artist's work, such as a mosaic. Alternatively, a plurality of images of the artist's works may be displayed on a plurality of blocks, and customers and/or collectors may collect each of the images and display together. The blocks may also be utilized by an artist to create an artwork. For example, the artist may utilize images displayed on a plurality of blocks and tile them together in unique expressive ways to create an artwork. Because the blocks may be easily moved, the artist may recreate an artwork by changing the image by changing the blocks.

It should be noted that various changes and modifications to the presently preferred embodiments described herein will be apparent to those skilled in the art. Such changes and modifications may be made without departing from the spirit and scope of the present invention and without diminishing its attendant advantages.

I claim:

1. A magnetic image block system comprising:
   a block having a first flat surface and a second flat surface, wherein an image is displayable on the first flat surface;
   a magnet rigidly disposed on the second surface,
   wherein the the second flat surface is made of a material selected from the group consisting of a metal, a magnet, and combinations thereof, wherein the magnet is disposed on the second flat surface via magnetic attraction between the magnet and the block.

2. The magnetic image block system of claim 1 further comprising:
   an extender disposed adjacent the second flat surface, the magnet disposed Between the extender and the block.

3. The magnetic image block system of claim 2 wherein the extender is adhered to the second surface of the block and a second magnet is adhered to the extender.

4. The magnetic image block system of claim 2 wherein the extender is magnetically held to the block and the magnet is magnetically held to the extender.

5. The magnetic image block system of claim 2 wherein the extender is the same shape as the block.

6. The magnetic image block system of claim 1 further comprising:
   a surface, wherein the block is magnetically held to the surface.

7. The magnetic image block system of claim 6 wherein the surface is made from a material selected from the group consisting of magnetic paint, a metal sheet, a sheet comprising at least one magnet, and combinations thereof.

8. The magnetic image block system of claim 1 further comprising:
   a frame, wherein the block is disposed within the frame, and further wherein the block is magnetically held within the frame.

9. The magnetic image block system of claim 1 further comprising:
   a second block, the second block having a first flat surface and a second flat surface, wherein an image is displayable on the first flat surface, and a magnet rigidly disposed on the second flat surface,
   wherein the first block and the second block are disposed in proximity to each other.

10. The magnetic image block system of claim 1 further comprising:
    a second block, the second block having a first flat surface and a second flat surface, wherein an image is displayable on the first flat surface, and a magnet is rigidly disposed on the second flat surface, wherein the first block and the second block are disposed in proximity to each other,
    wherein the first block has a first depth, and the second block has a second depth, wherein the first depth is larger than the second depth.

11. A magnetic image block system comprising:
    a block having a first flat surface and a second flat surface, wherein an image is displayable on the first flat surface;
    a magnet rigidly disposed on the second flat surface of the block; and
    an extender having a first flat surface and a second flat surface and a magnet on the second flat surface, wherein the extender is magnetically held to the magnet on the block.

12. The magnetic image block system of claim 11 wherein the extender is the same shape as the block.

13. The magnetic image block system of claim 11 further comprising:
    an image disposed on the first surface of the block.

14. The magnetic image block system of claim 11 further comprising:
    a surface, wherein the extender is magnetically held to the surface.

15. The magnetic image block system of claim 11 wherein the second Surface of the block comprises a material selected from the group consisting of magnetic paint, a metal sheet, a sheet comprising at least one magnet, and combinations thereof.

16. The magnetic image block system of claim 11 further comprising:

a frame, wherein the block is disposed within the frame, and further wherein the block is magnetically held within the frame.

17. The magnetic image block system of claim 11 further comprising:
a second block, the second block having a first flat surface and a second flat surface, wherein an image is displayable on the first flat surface, and a magnet rigidly disposed on the second surface,
wherein the first block and the second block are disposed in proximity to each other.

18. The magnetic image block system of claim 11 further comprising:
a second block, the second block having a first flat surface and a second flat surface, wherein an image is displayable on the first flat surface, and a magnet is rigidly disposed on the second flat surface, wherein the first block and the second block are disposed in proximity to each other,
wherein the first block has a first depth, and the second block has a second depth, wherein the first depth is larger than the second depth.

\* \* \* \* \*